(12) United States Patent
Steger et al.

(10) Patent No.: US 11,328,478 B2
(45) Date of Patent: May 10, 2022

(54) SYSTEM AND METHOD FOR EFFICIENT 3D RECONSTRUCTION OF OBJECTS WITH TELECENTRIC LINE-SCAN CAMERAS

(71) Applicant: MVTec Software GmbH, Munich (DE)

(72) Inventors: Carsten Steger, Oberschleißheim (DE); Markus Ulrich, Munich (DE)

(73) Assignee: MVTec Software GmbH, Munich (DE)

( * ) Notice: Subject to any disclaimer, the term of this patent is extended or adjusted under 35 U.S.C. 154(b) by 76 days.

(21) Appl. No.: 16/888,228

(22) Filed: May 29, 2020

(65) Prior Publication Data

US 2021/0327136 A1    Oct. 21, 2021

(30) Foreign Application Priority Data

Apr. 17, 2020  (EP) ................................. 20170097

(51) Int. Cl.
*G06T 17/10*    (2006.01)
*G06T 7/80*    (2017.01)
*G06T 7/593*    (2017.01)

(52) U.S. Cl.
CPC .............. *G06T 17/10* (2013.01); *G06T 7/593* (2017.01); *G06T 7/85* (2017.01)

(58) Field of Classification Search
CPC ... G01B 11/2433; G01B 11/02; G01B 11/043; G01B 11/046; G01B 11/06; G01B 11/22; G01B 11/2513; G01B 11/26; G01B 2290/65; G01B 9/02004; G01B 9/02015; G01B 9/02028; G01B 9/02069; G01B 9/02085; G01B 9/0209; G01B 9/02091
See application file for complete search history.

(56) References Cited

U.S. PATENT DOCUMENTS 6,471,044 B1 *  10/2002  Isaacs ................... B65G 43/08
                                                       198/347.4
2005/0200837 A1 *  9/2005  Mydlack .............. G01N 21/951
                                                       356/237.1

(Continued)

OTHER PUBLICATIONS

Stereoscopic Vision Using Line-Scan Sensors, Jul. 9, 2017 (Year: 2017).*

(Continued)

*Primary Examiner* — Ming Wu
(74) *Attorney, Agent, or Firm* — Kagan Binder, PLLC

(57) ABSTRACT

In this invention, systems and methods are described that allow performing stereo reconstruction with line-scan cameras in general configurations. Consequently, the cumbersome exact alignment of the sensor lines becomes superfluous. The proposed method requires that telecentric lenses instead of perspective lenses are mounted on the line-scan cameras. In this case, the images can be accurately rectified with stereo rectification. The rectified images can be used to perform an efficient stereo matching. The method comprises a camera model and a calibration procedure that allow to precisely model the imaging process, also including the modelling of lens distortions even if the sensor lines are not exactly mounted behind the principal points. This ensures a high accuracy of the resulting 3D reconstruction.

18 Claims, 5 Drawing Sheets

(56) References Cited

U.S. PATENT DOCUMENTS

2015/0347872 A1* 12/2015 Taylor .................. G01C 11/06
382/224
2016/0335778 A1* 11/2016 Smits ..................... G06T 7/20

OTHER PUBLICATIONS

Blahusch et al., "Algorithms and Evaluation of a High Precision Tool Measurement System", MVTec Software GmbH, Orleansstr. 34, D-81667, 1999, (6 pages).
Brown, "Decentering Distortion of Lenses", Photogrammetric Engineering, pp. 444-462, 1966, (19 pages).
Brown, "Close-Range Camera Calibration", Photogrammetric Engineering, pp. 855-867, 1971, (12 pages).
Brown et al., "Advances in Computational Stereo", IEEE Transactions on Pattern Analysis and Machine Intelligence, vol. 25, No. 8, pp. 933-1008, 2003, (16 pages).
Fitzgibbon, "Simultaneous linear estimation of multiple view geometry and lens distortion", Proceedings of the 2001 IEEE Computer Society Conference on Computer Vision and Pattern Recognition. CVPR 2001, ISBN 0-7695-1272-0, ISSN 1063-6919, 2001, (8 pages).
Fitzgibbon et al., "Direct Least Square Fitting of Ellipses", Pattern Analysis and Machine Intelligence, vol. 21, No. 5, pp. 476-480, 1999, (5 pages).
Godber et al., "The line-scan sensor: an alternative sensor modality for the exliaction of 3-D co-ordinate information", Optical Engineering, vol. 34, No. 10, 1995, (25 pages).
Gupta et al., "Linear Pushbroom Cameras", IEEE Transactions on Pattern Analysis and Machine Intelligence, vol. 19, No. 9, pp. 963-975, 1997, (13 pages).
Habib et al., "Analysis of Epipolar Geometry in Linear Array Scanner Scenes", The Photogrammetric Record, vol. 20, Issu. 109, pp. 27-47, 2005, (21 pages).
Habib et al., "Epipolar Geometry of Line Cameras Moving with Constant Velocity and Attitude", The Photogrammetric Record, vol. 27, No. 2, pp. 172-180, 2005, (9 pages).
Ilchev et al., "A Stereo Line Sensor System to High Speed Capturing of Surfaces in Color and 3D Shape", Proceedings of the International Conference on Computer Graphics Theory and Applications and International Conference on Information Visualization Theory and Applications, vol. 1, pp. 809-812, 2012, (4 pages).
Kim, "A Study on the Epipolarity of Linear Pushbroom Images", Photogrammetric Engineering & Remote Sensing, vol. 66, No. 8, pp. 961-966, 2000, (6 pages).
Lenz et al;., "Accuracy of videometry with CCD sensors*", ISPRS Journal of Photogrammetry and Remote Sensing, vol. 45, pp. 90-110, 1990, (21 pages).
Lilienblum et al., "A Structured Light Approach for 3-D Surface Reconstruction With a Stereo Line-Scan System", IEEE Transactions on Instrumentation and Measurement, vol. 64, No. 5, 2015, (10 pages).
Liu et al., "Epipolar rectification method for a stereovision system with telecentric cameras", Optics and Lasers in Engineering, vol. 83, pp. 99-105, 2016, (7 pages).
Mallon et al., "Which pattern? Biasing aspects of planar calibration patterns and detection methods", Pattern Recognition Letters, vol. 28, pp. 921-930, (10 pages).
Morgan et al., "Epipolar Resampling of Space-borne Linear Array Scanner Scenes Using Parallel Projection", Photogrammetric Engineering & Remote Sensing, vol. 72, No. 11, pp. 1255-1263, 2006, (9 pages).
Scharstein et al., "A Taxonomy and Evaluation of Dense Two-Frame Stereo Correspondence Algorithms", International Journal of Computer Vision, vol. 47, pp. 7-42, 2002, (36 pages).
Steger, "Unbiased Extraction of Curvilinear Structures from 2D and 3D Images", Technical University Munich, ISBN 978-3-89675-346-5, pp. 1-185, 1998, (195 pages).
Steger, "Subpixel-Precise Extraction of Lines and Edges", ISPRS, vol. XXXIII, 2000, (16 pages).
Steger, "Estimating the fundamental matrix under pure translation and radial distortion", ISPRS Journal of Photogrammetry and Remote Sensing, vol. 74, pp. 202-217, (16 pages).
Steger, "A Comprehensive and Versatile Camera Model for Cameras with Tilt Lenses", Int J Comput Vis, vol. 123, pp. 121-159, 2017, (39 pages).
Steger et al., "Machine Vision Algorithms and Applications", Wiley-VCH, 2nd, completely revised and enlarged Edition, pp. 1-494, 2018, (521 pages).
Sun et al., "Sensor for In-Motion Continuous 3D Shape Measurement Based on Dual Line-Scan Cameras", Sensors, vol. 16, Issu. 1949, pp. 2-15, 2016, (15 pages).
Sun et al., "Stereo Line-Scan Sensor Calibration for 3D Shape Measurement", Applied Optics, vol. 56, Issu. 28, pp. 7905-7914, 2017, (10 pages).
Ulrich et al., "A camera model for cameras with hypercentric lenses and some example applications", Machine Vision and Applications, vol. 30, pp. 1013-1028, 2019, (16 pages).
MVTec-2005a—Application-Notes; published as part of the software package "HALCON 7.1" on Sep. 1, 2005, (144 pages).
MVTec-2005b—Reference-Manual; published as part of the software package "HALCON 7.1" on Sep. 1, 2005, (1306 pages).
MVTec-2019—Reference-Manual; published on May 29, 2019, (2920 pages).
Richard Hartley, Andrew Zisserman: Multiple View Geometry in Computer Vision, 2nd edition. Cambridge University Press, Cambridge, 2003; ISBN-10: 0521540518; ISBN-13: 978-0521540513; Library of Congress Permalink: https://lccn.loc.gov/2004557531; pp. 170-172, 302-308, 345-355, 597-628 (53 pages).
Calow et al., "Fast line sensor system for simultaneous detection of color and 3D shape", English Abstract, Forum Bildverarbeitung, pp. 181-192, 2010, (13 pages).
Gerdes et al., "Calibration of a digital image processing system with a CCD camera Part 1: Modeling and procedure", English Abstract, Technisches Messen, vol. 60, Isse 6, pp. 225-261, 1993, (8 pages).
Lanser et al., "Multi-image calibration of a CCD camera", Pattern recognition, 17th DAGM Symposium, pp. 481-491, 1995, (12 pages).
Lanser, "Model-based localization based on monocular video images", Technical University Munich, Germany, pp. 1-244, 1997, (263 pages).
De Franchis et al., "On stereo-rectification of pushbroom images", IEEE International Conference on Image Processing (ICIP), pp. 5447-5451, 2014, (6 pages).
Steger et al., "Algorithms for the Orthographic-n-Point Problem", Journal of Mathematical Imaging and Vision, vol. 60, No. 2, pp. 246-266, 2017, (21 pages).
Yu et al., "Multiperspective Modeling, Rendering, and Imaging",, Photogrammetric Engineering, 1077952576-1077952576, pp. 1-36, 2008, (36 pages).
Extended European Search Report for European Application No. 20170097.8, dated Oct. 2, 2020, (6 pages).

* cited by examiner

SYSTEM AND METHOD FOR EFFICIENT 3D RECONSTRUCTION OF OBJECTS WITH TELECENTRIC LINE-SCAN CAMERAS

CROSS REFERENCE TO THE RELATED APPLICATION

This application is a Non-Provisional Utility application, under 35 U.S.C. § 111(a), of European Patent Application No. 20170097.8 filed Apr. 17, 2020, the entire content of which is incorporated herein as a part of the application.

DESCRIPTION

Field of the Invention

The invention relates generally to machine vision systems, and more particularly, to the 3D reconstruction of objects from 2D images.

Background of the Invention

Applications of 3D Reconstruction

The efficient and accurate reconstruction of a scene (object) from images is important for numerous computer vision and particularly machine vision applications. For example, a printed circuit board (PCB) can be inspected robustly for missing or wrongly placed electronic components by using a 3D reconstruction of the PCB (Steger et al., 2018, Chapter 3.10.1).

Furthermore, produced objects can be measured in 3D to check their correct shape or dimensions, for example, by comparing the reconstructed surface with a reference object (Steger et al., 2018, Chapter 4.13). Another example is object recognition for pick-and-place applications, where the exact 3D pose (position and orientation) of an object must be determined in 3D data to be able to grasp the object with a robot (Steger et al., 2018, Chapter 4.14).

3D Reconstruction Technologies

In the machine vision industry, there are many different technologies of 3D image acquisition devices available that return 3D data. The principle behind the majority of 3D image acquisition devices is triangulation. One of the most prominent representatives of triangulation-based 3D reconstruction is stereo reconstruction, where the scene is observed with at least two cameras from different positions (Steger et al., 2018, Chapter 2.5.1). The 3D coordinates of a point are obtained by identifying corresponding points in the images and intersecting their associated lines of sight in 3D space. Another representative is 3D reconstruction based on the sheet of light principle, often also called laser triangulation (Steger et al., 2018, Chapter 2.5.2). A sheet of light sensor consists of a camera and a laser projector that projects a laser plane onto the scene. The intersection of the laser plane with the object is extracted as lines in the camera image. Each image point on the extracted lines represents a line of sight in the camera, which is intersected with the laser plane in 3D to obtain the reconstructed point. To reconstruct the complete shape of an object with a sheet of light sensor, the object must be moved relative to the sensor. A third category of triangulation-based 3D sensors are structured light sensors (Steger et al., 2018, Chapter 2.5.3). They consist of a camera and a projector that projects patterns onto the scene.

From the distortions of the patterns in the camera image the 3D shape of the object can be inferred. Besides triangulation, a second widespread 3D reconstruction principle is time-of-flight (TOF) measurement. TOF sensors emit radiation and measure the time difference between the emission of the radiation and its return to the sensor, after being reflected on the object's surface (Steger et al., 2018, Chapter 2.5.4).

Stereo Reconstruction

The present invention focuses on stereo reconstruction because it is one of the most prominent principles for 3D reconstruction. There are many commercial stereo sensors available, where typically two cameras are contained in a single housing. However, a more flexible setup is to use two or more individual cameras. In this case, the hardware and setup can be optimally chosen or adapted for the task to be solved: For example, the resolution and size of the sensors, the type of lenses, the focal length of the lenses, and the relative orientation of the cameras can be optimally chosen for a given application. These parameters influence the accuracy, the robustness, and the field of view of the stereo reconstruction.

While stereo sensors are typically factory calibrated, the individual setup must be calibrated in situ before the 3D reconstruction can be performed. Calibration means the determination of the parameters of the interior orientation of all cameras and their relative orientations. The relative orientation describes the position and orientation of two cameras with respect to each other and is typically represented by a rigid 3D transformation (Steger et al., 2018, Chapter 3.10.1.1). In the following, a rigid 3D transformation will also be denoted as pose. The interior orientation of a camera describes the projection of a 3D point given in the camera coordinate system into a 2D point in the image coordinate system. For example, the interior orientation of an area-scan camera with a perspective (entocentric) lens can be described by the following parameters: the principal distance, the row and column coordinates of the principal point, the horizontal and vertical pixel pitch on the sensor, and parameters that model lens distortions (Steger et al., 2018, Chapter 3.9.1). Additionally, often an exterior orientation is modelled, which is determined by the position and orientation of the system of cameras with respect to a world coordinate system. The origin of the world coordinate system is often defined by the origin of the calibration object (see below) that was used to perform the calibration. Consequently, the exterior orientation most often describes the pose of the calibration object with respect to a previously chosen reference camera (Steger, 2017).

To perform the calibration, images of a suitable calibration object with known control points must be acquired by all cameras. These images will be referred to as calibration images in the following. While sometimes 3D calibration objects are used, in most machine vision applications planar calibration objects are preferred (Steger et al., 2018, Chapter 3.9.4.1). They can be manufactured accurately more easily than 3D calibration objects. Furthermore, they can be handled more easily by the user. They also allow the calibration of cameras in applications where a backlight illumination is necessary, for example by using a transparent calibration object on which opaque control points are applied, or vice versa. Planar calibration objects can also be used to easily define a plane in the world by simply placing the calibration object onto the plane of interest in the world. Measurements in the image can be transformed into measurements in world coordinates in the defined plane (Steger et al., 2018, Chapter 3.9.5). Often, a planar calibration object with circular marks is used because their center point can be determined with high accuracy (Lenz and Fritsch, 1990; Lanser et al., 1995; Lanser, 1997; Steger et al., 2018, Chapter 3.9.4.1). Because of degeneracies that arise when calibrating with a planar calibration object and a single calibration image (Steger et al., 2018, Chapter 3.9.4.3), cameras are typically calibrated by using multiple calibration images in which the planar calibration object is acquired in different poses (Steger et al., 2018, Chapter 3.9.4.4). Alternatively, methods of uncalibrated stereo might be applied as well. In these cases, the calibration images do not necessarily need to contain a calibration object.

Telecentric Lenses

In some machine vision applications, telecentric lenses are used instead of perspective lenses. Telecentric lenses perform a telecentric projection on the object side. Therefore, they perform a parallel projection of the world into the image (Steger et al. 2018, Chapter 2.2.4). Especially in measurement applications, the use of telecentric lenses may increase the accuracy because they eliminate perspective distortions. Telecentric lenses are constructed such that the aperture stop is placed on the image-side focal point, which filters out all light rays that are not parallel to the optical axis (Steger et al. 2018, Chapter 2.2.4). Because of their parallel projection in object space, the diameter of telecentric lenses must be chosen at least as large as the object to the imaged.

Camera Models for Area-Scan Cameras

A versatile camera model for area-scan cameras and a suitable calibration procedure for cameras with perspective and telecentric lenses are proposed in (Steger, 2017). The calibration procedure allows calibrating setups of arbitrary combinations of perspective and telecentric cameras (including the support of tilt lenses).

Binocular Stereo—Image Rectification

A calibrated camera setup is the prerequisite for stereo reconstruction. To simplify the following discussions, we restrict ourselves to the case of binocular stereo, i.e., to the case of two cameras. However, the concepts can be easily extended to more than two cameras. Corresponding points in the two images must be determined to reconstruct 3D points. It is known that for a given point in the first image, the corresponding point in the second image must lie on the so-called epipolar line (Steger et al. 2018, Chapter 3.10.1.3). To speed up the search for corresponding points, it is common practice to transform the two input images into a representation that is in accordance with the epipolar standard geometry (Steger et al., 2018, Chapter 3.10.1.4). This transformation is called stereo image rectification. The parameters of the transformation can be derived from the result of the camera calibration. The rectified images are free of lens distortions and corresponding image points lie in the same image row in both images. Therefore, the search for corresponding points can be restricted to a single image row, and hence can be performed very efficiently. This is especially important for applications with the aim of a dense reconstruction, i.e., applications in which a 3D coordinate for multiple pixels in the input images is required.

Binocular Stereo—Stereo Matching

The process of determining the corresponding points in the images is called stereo matching. To obtain a dense reconstruction, stereo matching tries to find for each point (pixel) in the first rectified image the corresponding point in the second rectified image. Since it is known that the corresponding points in the rectified images must lie in the same image row, the relevant information for 3D reconstruction are the column coordinates of the corresponding points in the rectified images. More specifically, the depth of a 3D point (i.e., its distance from the camera) depends only on the difference of the column coordinates of its corresponding points in the rectified images. This difference is called disparity (Steger et al., 2018, Chapter 3.10.1.5). Consequently, the main goal of dense reconstruction is to find the disparity for each pixel in the first rectified image. Overviews of different dense stereo reconstruction algorithms can for example, be found in (Scharstein and Szeliski, 2002; Brown et al., 2003). In machine vision applications, the determination of the disparity is often regarded as a template matching problem (Steger et al., 2018, Chapter 3.10.1.6): template matching tries to find for each point in the first image the most similar point in the second image that lies in the same image row. The similarity is typically measured by comparing a rectangular image patch around the point in the first image with the rectangular image patches around all possibly corresponding points in the second image. The most common similarity measures are the sum of absolute gray value differences, the sum of squared gray value differences, and the normalized cross correlation (Steger et al., 2018, Chapter 3.10.1.6). Dense stereo reconstruction that is based on template matching combines an efficient computation (in terms of both, memory and computation time) with an accuracy that is sufficient for most applications. Alternative methods for dense disparity estimation are based on variational approaches that are able to compute disparities even in low-textured image regions. It is important to note that all efficient methods for dense disparity estimation assume that the input image pair has been rectified to the epipolar standard geometry before.

Line-Scan Cameras

In some machine vision applications, line-scan cameras are preferred over area-scan cameras. The advantage of line-scan cameras is their better resolution per price compared to area-scan cameras. Currently, line-scan cameras with lines up to 16384 pixels are available (Steger et al. 2018, Chapter 2.3.4). To obtain a 2D image of an object with a line-scan camera, multiple 1D images are stacked over time while moving the camera with respect to the object. Consequently, the height of the resulting image is essentially unlimited because it corresponds to the number of 1D images that are acquired over time. In the invention, the movement of the camera with respect to the object is denoted as relative motion. The relative motion is typically realized either by moving the camera across the stationary object or by mounting the camera above the moving object (Steger et al. 2018, Chapter 2.3.1.1). In the majority of machine vision applications with line-scan cameras, a linear motion with a constant speed is applied. The relative motion can be realized, for example, by a linear motion slide, a conveyor belt, or other linear actuators. A camera model for line-scan cameras with perspective lenses is described in (Steger et al., 2018, Chapter 3.9.3).

Stereo Reconstruction with Perspective Line-Scan Cameras

The accuracy of stereo reconstruction is naturally limited by the image resolution. Therefore, for applications with high demands on the reconstruction accuracy, it would be highly desirable to use high-resolution line-scan cameras instead of area-scan cameras for stereo reconstruction.

Unfortunately, stereo images of perspective line-scan cameras generally cannot be rectified to the epipolar standard geometry (Gupta and Hartley, 1997; Kim, 2000, Habib et al., 2005a, b). This prevents an efficient stereo reconstruction, and hence hampers the general use of line-scan cameras for stereo reconstruction. However, in (Habib et al., 2005a, b) it is shown that there are two special ideal configurations of line-scan cameras with perspective lenses for which a rectification is indeed possible: The ideal across-track configuration and the ideal along-track-configuration, where the sensor lines of both sensors must be exactly aligned with respect to each other in a certain way. Furthermore, these configurations assume that no lens distortions are present. Based on these two configurations, a few perspective line-scan stereo systems for industrial applications are proposed in the literature (Calow et al., 2010; Ilchev et al., 2012; Lilienblum and Al-Hamadi, 2015; Sun et al. 2016; Sun et al, 2017; Godber et al., 1995). In these systems, the sensor lines are aligned manually to one of the two ideal configurations, e.g., by using a suitable adjustment device. Unfortunately, the papers do not disclose in detail how the exact alignment of the sensor lines is achieved and how much time is necessary to align the sensors. Consequently, stereo with perspective line-scan cameras is complex and requires expensive precision equipment and cumbersome manual labor. Therefore, also from a practical and usability point of view, it would be a great step forward to be able to perform an efficient stereo reconstruction with line-scan cameras that are not restricted to one of the two ideal configurations. Furthermore, even if the lines can be exactly aligned with respect to each other, lens distortions would again prevent the correct rectification of the images if the sensor line is not exactly mounted behind the principal point. Neglecting lens distortions would adversely affect the accuracy of the 3D reconstruction.

SUMMARY OF THE INVENTION

The invention is specified in the claims. It is directed to methods and apparatuses for reconstructing a 3D scene with at least two line-scan cameras with telecentric lenses. In the invention, the terms "3D scene", "3D object", and "3D objects" are used synonymously. The invention also relates to a system or apparatus performing and/or implementing the described methods. The methods are computer-implemented.

In this invention, systems and methods are described that allow performing stereo reconstruction with line-scan cameras in general configurations. Consequently, the cumbersome exact alignment of the sensor lines becomes superfluous. The method of the present disclosure requires that telecentric lenses instead of perspective lenses are mounted on the line-scan cameras. In this case, the images can be accurately rectified with stereo rectification. The rectified images can be used to perform an efficient stereo matching. The method comprises a camera model and a calibration procedure that allow to precisely model the imaging process, also including the modelling of lens distortions even if the sensor lines are not exactly mounted behind the principal points. This ensures a high accuracy of the resulting 3D reconstruction.

In a preferred embodiment of the invention, the system comprises two or more line-scan cameras with telecentric lenses for acquiring images of the 3D objects that are to be reconstructed. In the invention, a line-scan camera with a telecentric lens is synonymously also referred to as a telecentric line-scan camera. Furthermore, in the preferred embodiment, the system additionally comprises a device that performs a relative motion of the 3D objects with respect to the telecentric line-scan cameras. In a preferred embodiment, the device performs a linear motion with a constant speed by a linear motion slide, a conveyor belt, or by other linear actuators, for example. In a preferred embodiment, the system additionally comprises a computer that is configured for performing the method comprising the steps that are described in the following. The steps one to three deal with the calibration of the system and are performed offline, i.e., after setting up the system and before acquiring images of the 3D object to be reconstructed. The steps four to seven are performed online and comprise the image acquisition of the 3D object, the telecentric image rectification, the disparity estimation, and the actual 3D reconstruction.

In a first step, with each telecentric line-scan camera one or more telecentric line-scan calibration images of a calibration object are acquired. The poses of the calibration objects vary over the calibration images. The calibration object has multiple control points with known 3D coordinates in world units (world coordinates). The telecentric line-scan calibration images are acquired by performing a relative motion of the calibration object with respect to the telecentric line-scan cameras. For each pose of the calibration object and each camera, the acquired 1D image lines are stacked on top of each other yielding a telecentric line-scan calibration image. In a preferred embodiment, multiple telecentric line-scan images of a planar calibration object are acquired with each telecentric line-scan camera. In an alternative embodiment, a single telecentric line-scan image is acquired with each telecentric line-scan camera. As a result, a set of telecentric line-scan calibration images is obtained for each camera, where said set contains at least one image. For a meaningful calibration, it is important that all images are acquired by performing the identical relative motion between the telecentric line-scan camera and the calibration object.

In a second step, based on the telecentric line-scan calibration images, a camera calibration is performed. For this, a suitable camera model is defined that is able to accurately describe the image creation process and the relative pose(s) between the cameras. In a preferred embodiment, the 2D positions of the visible control points of the calibration object are automatically measured in the telecentric calibration images (image coordinates). Furthermore, the correspondences between the measured 2D image points and the 3D points of the calibration object are automatically determined. The parameters of the camera model are determined by minimizing an error that relates the 2D coordinates of the image points of the extracted control points in the telecentric line-scan calibration images with the 3D coordinates of the corresponding points of the calibration object.

As the result of the calibration, values for the camera parameters are obtained. The camera parameters comprise the parameters of the interior orientation of all cameras, the parameters of the relative orientations between all cameras, and the parameters of the absolute orientation of the calibration object in all telecentric line-scan calibration images.

In the third step, based on the camera parameters that result from the camera calibration in the second step, a telecentric rectification mapping is computed that can be used to rectify a telecentric line-scan image pair of a pair of telecentric line-scan cameras. The telecentric rectification mapping represents the stereo image rectification, and hence, describes the geometric transformation of the telecentric line-scan image pair to the epipolar standard geometry. Consequently, when applying the mapping to a telecentric line-scan image pair, the obtained rectified telecentric line-scan image pair is free of lens distortions and corresponding image points lie in the same image row.

In a preferred embodiment of the invention, the previously described first three steps are performed offline once after setting up or modifying the system. Consequently, the three steps need to be re-executed only if the camera setup changes and if this change influences the parameters that are estimated during camera calibration. The telecentric rectification mapping is stored for later use in the online phase. In a preferred embodiment, the rectification mapping is stored as a look-up-table (LUT) to enable an efficient rectification in the online phase. The LUT stores for each pixel in the rectified telecentric line-scan image the position of the corresponding pixel in the original telecentric line-scan image. The LUT may optionally contain weights for an appropriate gray value interpolation to obtain rectified images of higher quality resulting in a higher accuracy of the final 3D reconstruction.

In the fourth step, the online phase starts with the acquisition of telecentric line-scan images of the 3D object that is to be reconstructed by using the setup that was previously calibrated with the method described in the first three steps. Because for a 3D reconstruction at least two cameras are necessary, in the preferred embodiment a telecentric line-scan image pair is acquired with a pair of telecentric line-scan cameras. In an alternative embodiment, a telecentric line-scan image pair is selected from more than two telecentric line-scan cameras. Each telecentric line-scan image is created by performing the identical relative motion that was applied during the acquisition of the telecentric line-scan calibration images in the first step.

In the fifth step, the acquired telecentric line-scan image pair of the 3D object to be reconstructed is rectified by applying the telecentric rectification mapping of the respective pair of telecentric line-scan cameras that was computed in step three. Corresponding points in the resulting rectified telecentric line-scan image pair lie in the same image row. Furthermore, the resulting rectified telecentric line-scan image pair is free of lens distortions.

In the, optional, sixth step, the disparities are computed from the resulting rectified telecentric line-scan image pair by one of different available stereo matching approaches that exploit the epipolar standard geometry. In a preferred embodiment of the invention, an approach for dense disparity estimation is applied yielding a disparity image that contains for each defined pixel a disparity value. Undefined pixels may occur, for example, in case of occlusions or in low-textured image parts, where corresponding pixels cannot be determined reliably. In a preferred embodiment, a dense disparity estimation approach that is based on template matching is applied.

In the, optional, seventh step, the disparities that are computed in the sixth step are converted into distances. The conversion is performed based on the interior and relative orientation of the rectified telecentric line-scan image pair. In a preferred embodiment, the distances are computed for each defined pixel in the disparity image, yielding a distance image. In a preferred embodiment, the distance image represents the reconstruction of the 3D object. In an alternative embodiment, the distance values are further converted into 3D coordinates based on their row and column coordinates in the distance image and based on the interior orientation of the rectified telecentric line-scan image pair.

According to one aspect, the invention provides a system for reconstructing a 3D object with at least two line-scan cameras. The system comprises:
(a) at least two telecentric line-scan cameras;
(b) at least one device configured to performing a relative motion of said 3D object with respect to said telecentric line-scan cameras; and
(c) a computer configured for
   (c1) acquiring with each telecentric line-scan camera a set of telecentric line-scan calibration images while performing said relative motion, where said set contains one or more images;
   (c2) performing a camera calibration based on said sets of telecentric line-scan calibration images;
   (c3) based on the result of said camera calibration, computing a telecentric rectification mapping that rectifies a telecentric line-scan image pair of a pair of telecentric line-scan cameras;
   (c4) acquiring a telecentric line-scan image pair with a pair of telecentric line-scan cameras of said 3D object while performing said relative motion; and
   (c5) rectifying said telecentric line-scan image pair of said 3D object with said telecentric rectification mapping, yielding a rectified telecentric line-scan image pair.

The computer may further be configured to perform computing disparities from said rectified telecentric line-scan image pair, with the disparities representing the reconstructed 3D object.

The computer may further be configured to perform converting said disparities into distances, yielding a reconstruction of said 3D object.

The computer may further be configured to perform converting said disparities into 3D coordinates, yielding a reconstruction of said 3D object.

Said relative motion is preferably a linear motion. The linear motion may be of constant speed, or the linear motion may be of variable speed and the image acquisition of telecentric line-scan images is triggered appropriately to ensure a constant speed.

The calibration images may be images of a calibration object. The calibration object may be a planar calibration object. The calibration object may be a 3D calibration object.

Preferably, in said camera calibration, camera parameters are determined, which comprise parameters of exterior orientations for the telecentric line-scan calibration images and, for each telecentric line-scan camera, parameters of a relative and of an interior orientation.

The telecentric rectification mapping may rectify a telecentric line-scan image pair of a pair of telecentric line-scan cameras to the epipolar standard geometry.

The telecentric rectification mapping may be stored in a look-up-table. According to an embodiment, rectifying said telecentric line-scan image pair comprises applying said look-up-table to said telecentric line-scan image pair.

Computing disparities from said rectified telecentric line-scan pair may comprise a dense disparity estimation yielding a disparity image.

Furthermore, converting said disparities into distances may comprise computing a distance image.

According to an embodiment, the camera calibration is performed by applying a sparse Levenberg-Marquardt algorithm.

BRIEF DESCRIPTION OF THE DRAWINGS

The invention will be more fully understood from the following detailed description, in conjunction with the accompanying figures, wherein.

DETAILED DESCRIPTION OF THE PREFERRED EMBODIMENTS

Figure 4:
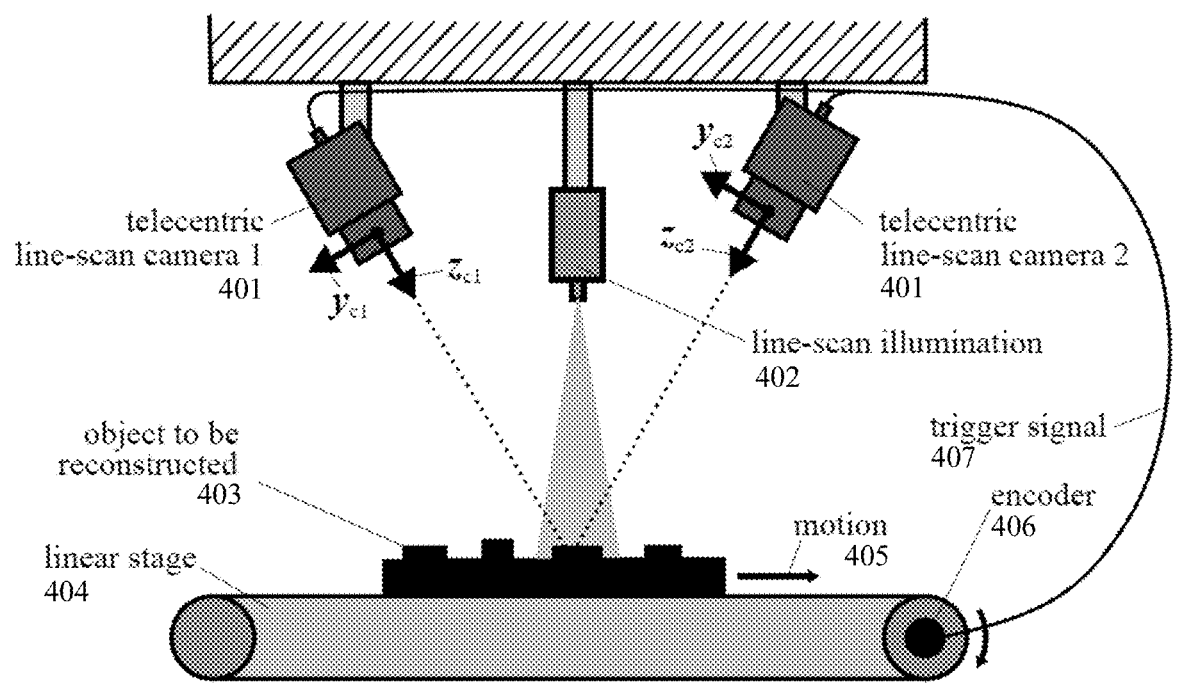
FIG. 4 illustrates an example stereo setup with two telecentric line-scan cameras. The cameras are mounted in an along-track configuration. A line-shaped light source is used to cover the footprint of both sensor lines. An encoder triggers the image acquisition to ensure a constant speed and a simultaneous acquisition with both cameras.

In a preferred embodiment of the invention, the system comprises two telecentric line-scan cameras 401 (see FIG. 4) for acquiring images of the 3D objects 403 that are to be reconstructed. In an alternative embodiment of the invention, the system comprises a multi-view setup of at least two telecentric line-scan cameras. A multi-view setup of more than two cameras might be helpful, for example, to extend the region in the world that can be reconstructed. Therefore, also the proportion of occluded object parts can be minimized. Alternatively or additionally, a larger number of cameras might increase the accuracy of the 3D reconstruction because certain parts of the object are observed from multiple directions. In the scope of the present disclosure, "two or more cameras" does not necessarily mean that two or more physical cameras must be used. Instead, two or more cameras can also be realized by using only a single physical camera, and acquiring images with this camera from different perspectives. For example, a single telecentric line-scan camera can be mounted on a robotic arm that follows multiple different predetermined paths to realize multiple cameras.

Furthermore, in the preferred embodiment, the system additionally comprises a device 404 that performs a relative motion of the 3D objects with respect to the telecentric line-scan cameras. In a preferred embodiment, this device performs a linear motion with a constant speed by a linear motion slide, a conveyor belt, or by other linear actuators, for example. In an alternative embodiment, a linear motion of variable speed can be used. In the latter case, an encoder 406 that triggers 407 the image acquisition is used to ensure an equidistance image acquisition. By this, the motion of variable speed can be easily transformed to a motion of constant speed. Consequently, by using an encoder, a camera model that assumes a constant speed can be also applied to applications in which a device for realizing the relative motion is used that does not provide a motion of constant speed.

Figure 1:
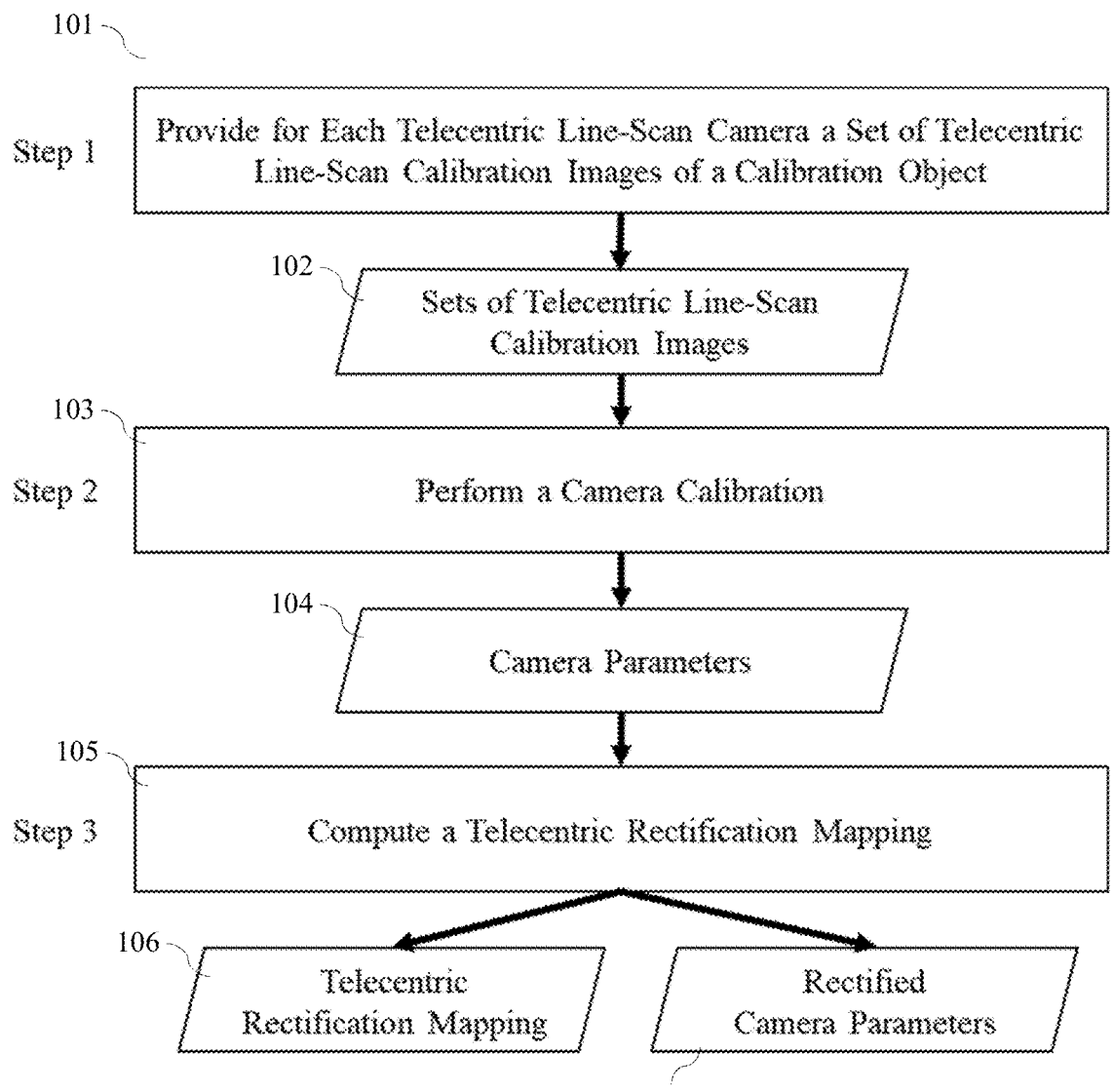
FIG. 1 shows the steps of the offline part of the invention, which basically comprise the camera calibration and the computation of a telecentric rectification mapping.
Figure 2:
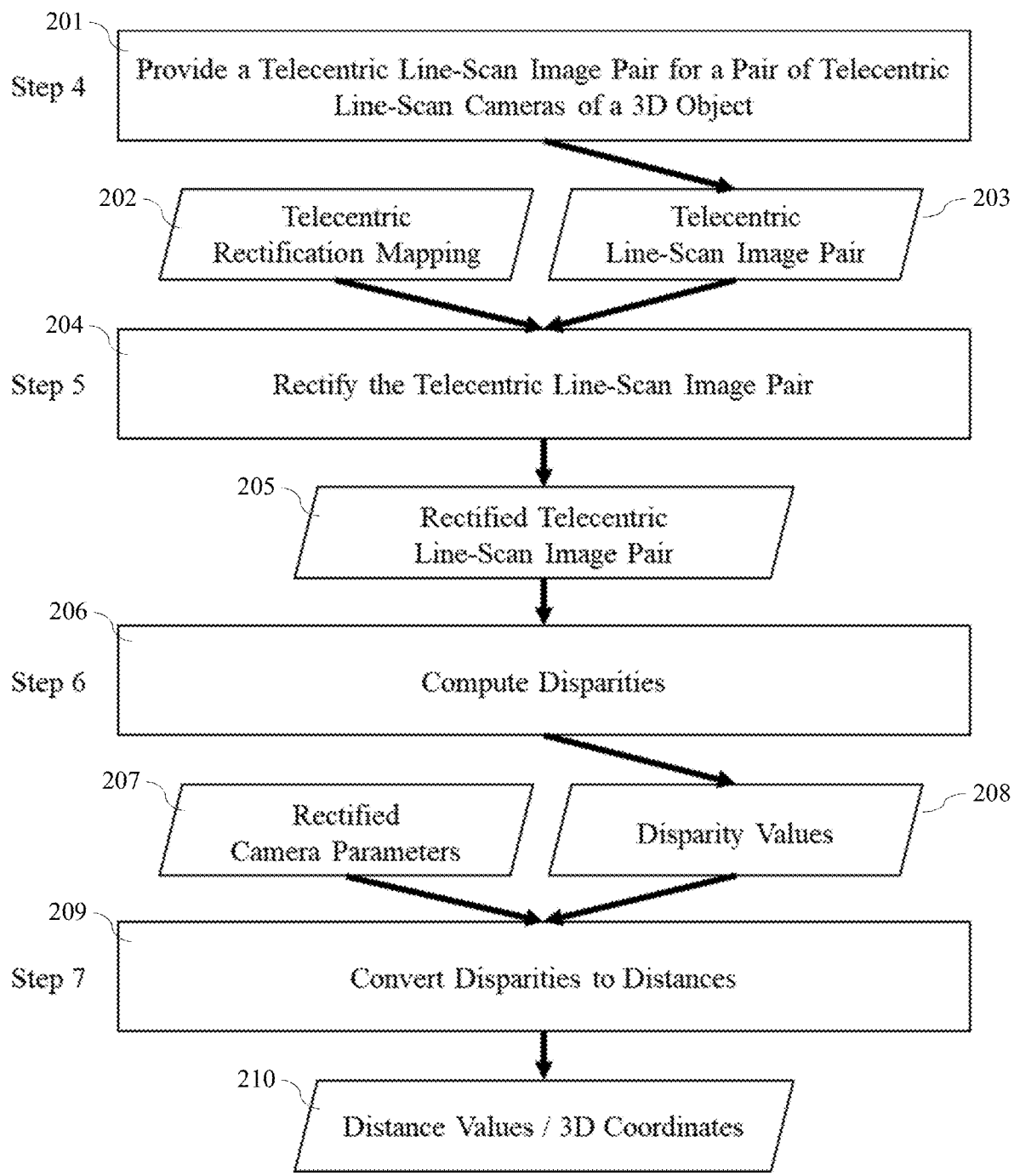
FIG. 2 shows the steps of the online part of the invention, which basically comprise the image rectification, the computation of disparity values, and, optionally, the conversion of the disparity values to distance values or 3D coordinates.

In a preferred embodiment, the system additionally comprises a computer that is configured for performing the method comprising the seven steps that are described in the following in detail. The steps one to three deal with the calibration of the system and are performed offline, i.e., after setting up the system and before acquiring images of the 3D object to be reconstructed. The individual steps of the offline phase are visualized in FIG. 1. The steps four to seven are performed online and comprise the image acquisition of the 3D object, the telecentric image rectification, the disparity estimation, and the actual 3D reconstruction. The individual steps of the online phase are visualized in FIG. 2.

Acquisition of a Set of Telecentric Line-Scan Calibration Images

In a first step 101, with each telecentric line-scan camera one or more telecentric line-scan calibration images are acquired. In a preferred embodiment of the invention, the calibration images are images of a calibration object. In an alternative embodiment of the invention, methods of uncalibrated stereo are applied, for which the calibration images do not necessarily need to contain a calibration object. When using a calibration object, the poses of the calibration objects vary over the calibration images. The calibration object has multiple control points with known 3D coordinates in world units (world coordinates). In a preferred embodiment, a planar calibration object with circular control points is used (Steger et al. 2018, Chapter 3.9.4.1). In an alternative embodiment, a planar calibration object with a checkerboard design is used. The use of other designs of calibration objects is easily possible without departing from the scope of the invention. If a planar calibration object is used, in general at least two telecentric line-scan calibration images are necessary to determine all camera parameters (see below) unambiguously. In an alternative embodiment, a single telecentric line-scan calibration image is used to determine a subset of camera parameters while keeping the remaining camera parameters at fixed values. In another alternative embodiment, a 3D calibration object is used. In contrast to a planar calibration object, the control points of a 3D calibration object do not lie in a common plane. Depending on the design of the 3D calibration object, the determination of all camera parameters might also be possible with a single calibration image.

The telecentric line-scan calibration images are acquired by performing a relative motion of the calibration object with respect to the telecentric line-scan cameras. For each pose of the calibration object and each camera, the acquired 1D image lines are stacked on top of each other yielding a telecentric line-scan calibration image. In a preferred embodiment, multiple telecentric line-scan images of a planar calibration object are acquired with each telecentric line-scan camera. In an alternative embodiment, a single telecentric line-scan image is acquired with each telecentric line-scan camera. As a result, at step 102, a set of telecentric line-scan calibration images is obtained for each camera, where said set contains at least one image. For a meaningful calibration, it is important that all images are acquired by performing the identical relative motion.

Camera Calibration

In a second step (103), based on the telecentric line-scan calibration images, a camera calibration is performed. For this, a suitable camera model is defined that is able to accurately describe the image creation process and the relative pose(s) between the cameras. In a preferred embodiment, the 2D positions of the visible control points of the calibration object are automatically measured in the telecentric line-scan calibration images (image coordinates). Furthermore, the correspondences between the measured 2D image points and the 3D points of the calibration object are automatically determined (Steger et al. 2018, Chapter 3.9.4.1). In an alternative embodiment, the 2D image points are measured in the calibration images manually by a user and the correspondences are also specified by the user. The parameters of the camera model (camera parameters) are determined by minimizing an error that relates the 2D coordinates of the image points of the extracted control points in the telecentric line-scan calibration images with the 3D coordinates of the corresponding points of the calibration object.

In the following, a camera model that is suited for the calibration of a system of an arbitrary number (multi-view setup) of telecentric line-scan cameras is described in detail.

The camera model for a multi-view setup of telecentric line-scan cameras is based on a camera model for a multi-view setup of area-scan cameras. Therefore, at first, a camera model for a multi-view setup of area-scan cameras is reviewed.

Camera Model for Multi-View Setup of Area-Scan Cameras

The camera model for area-scan cameras is based on the description in (Steger 2017, Section 6.1). It is capable of modeling a multi-view setup with $n_c$ cameras. To calibrate the cameras, $n_o$ images of the calibration object in different poses are used. Each pose l ($l=1, \ldots, n_o$) of the calibration object defines a point transformation from the calibration object coordinate system to the camera coordinate system of a reference camera r. In the following, we will assume r=1 without loss of generality because we can renumber the cameras arbitrarily. Let $p_o=(x_o, y_o, z_o)^T$ denote a point in the calibration object coordinate system. The transformation of the point from the calibration object coordinate system to the reference camera coordinate system can be described as $$p_l = R_l p_o + t_l. \quad (1)$$

Here, $t_l=(t_{l,x}, t_{l,y}, t_{l,z})^T$ is a translation vector and $R_l$ is a rotation matrix. $R_l$ is parameterized by Euler angles as $R_l=R_x(\alpha_l)R_y(\beta_l)R_z(\gamma_l)$. This transformation is called exterior orientation. The point $p_l$ is then transformed into the camera coordinate system of camera k ($k=1, \ldots, n_c$):

$$p_k = R_k p_l + t_k, \quad (2)$$

where $R_k=R_x(\alpha_k)R_y(\beta_k)R_z(\gamma_k)$ and $t_k=(t_{k,x},t_{k,y},t_{k,z})^T$ describe the relative pose of camera k with respect to camera 1. Hence, with the above convention, $R_k=I$ and $t_k=0$ for k=1. Thus, if we only calibrate a single camera, the transformation in (2) is redundant and can be omitted. Other parametrizations of the transformation or of the rotation can be used without departing from the scope of the invention, such as Axis-Angle parametrizations, Quaternions and others. Next, the point $p_k=(x_k,y_k,z_k)^T$ is projected into the image plane (image plane coordinate system). For entocentric lenses, the projection is given by:

$$\begin{pmatrix} x_u \\ y_u \end{pmatrix} = \frac{c}{z_k} \begin{pmatrix} x_k \\ y_k \end{pmatrix}, \quad (3)$$

where c is the principal distance of the lens. For telecentric lenses, the projection is given by:

$$\begin{pmatrix} x_u \\ y_u \end{pmatrix} = m \begin{pmatrix} x_k \\ y_k \end{pmatrix}, \quad (4)$$

where m is the magnification of the lens.

Subsequently, the undistorted point $(x_u, y_u)^T$ is distorted to a point $(x_d, y_d)^T$. In a preferred embodiment of the invention one of the following two distortion models are applied (Steger 2017, Section 6.1; Steger et al 2018, Chapter 3.9.1.3): the division model (Lenz and Fritsch 1990; Lanser 1997; Blahusch et al. 1999; Fitzgibbon 2001; Steger 2012) and the polynomial model (Brown 1966, 1971).

In the division model, the undistorted point $(x_u, y_u)^T$ is computed from the distorted point by:

$$\begin{pmatrix} x_u \\ y_u \end{pmatrix} = \frac{1}{1 + \kappa r_d^2} \begin{pmatrix} x_d \\ y_d \end{pmatrix}, \quad (5)$$

where $r_d^2 = x_d^2 + y_d^2$. The division model can be inverted analytically:

$$\begin{pmatrix} x_d \\ y_d \end{pmatrix} = \frac{2}{1 + \sqrt{1 - 4\kappa r_u^2}} \begin{pmatrix} x_u \\ y_u \end{pmatrix}, \quad (6)$$

where $r_d^2 = x_u^2 + y_u^2$. The division model only supports radial distortions.

The polynomial model supports radial as well as decentering distortions. The undistorted point is computed by:

$$\begin{pmatrix} x_u \\ y_u \end{pmatrix} = \begin{pmatrix} x_d(1 + K_1 r_d^2 + K_2 r_d^4 + K_3 r_d^6) + (P_1(r_d^2 + 2x_d^2) + 2P_2 x_d y_d) \\ y_d(1 + K_1 r_d^2 + K_2 r_d^4 + K_3 r_d^6) + (2P_1 x_d y_d) + P_2(r_d^2 + 2y_d^2)) \end{pmatrix}. \quad (7)$$

The polynomial model cannot be inverted analytically. The computation of the distorted point from the undistorted point must be performed by a numerical root finding algorithm.

A different distortion model might be easily applied without departing from the scope of the invention, for example because it better fits the distortions of the used lenses compared to the division or polynomial model.

Finally, the distorted point $(x_d, y_d)^T$ is transformed into the image coordinate system:

$$\begin{pmatrix} x_i \\ y_i \end{pmatrix} = \begin{pmatrix} x_d/s_x + c_x \\ y_d/s_y + c_y \end{pmatrix}. \quad (8)$$

Here, $s_x$, and $s_y$ denote the pixel pitches on the sensor and $(c_x, c_y)^T$ is the principal point. The x coordinate refers to the horizontal axis in the image (increasing rightward) and the y coordinate to the vertical axis (increasing downward).

Consequently, the camera model for telecentric area-scan cameras consists of the following camera parameters:

- The six parameters of the exterior orientation (modeling the pose of the calibration objects in the $n_o$ images): $\alpha_l$, $\beta_l$, $\gamma_l$, $t_{l,x}$, $t_{l,y}$, and $t_{l,z}$.
- The six parameters of the relative orientation of the $n_c$ cameras with respect to camera 1: $\alpha_k$, $\beta_k$, $\gamma_k$, $t_{k,x}$, $t_{k,y}$, and $t_{k,z}$.
- The interior orientation of each camera (for simplicity, we omit the superscript k here): c or m; $\kappa$ or $K_1$, $K_2$, $K_3$, $P_1$, $P_2$; $s_x$, $s_y$, $c_x$, $c_y$.

The calibration of the camera model is described in detail in (Steger 2017, Sections 9 and 10).

The above parametrization is very intuitive for machine vision users (Steger 2017, Section 6.1). All parameters have a physical meaning that is easy to understand. Approximate initial values for the interior orientation parameters simply can be read off the data sheets of the camera ($s_x$ and $s_x$) and the lens (c or m) or can be obtained easily otherwise (the initial values for the principal point can be set to the center of the image and the distortion coefficients can typically be set to 0). Furthermore, the calibration results are easy to check for validity.

Camera Model for a Single Entocentric Line-Scan Camera

The camera model for telecentric line-scan cameras is based on the camera model for entocentric line-scan cameras, which was first described in (MVTec Software GmbH 2005a, b). Therefore, in this section, the camera model for a single entocentric line-scan camera is reviewed. Details of the camera model for entocentric line-scan cameras can also be found in (Steger et al. 2018, Chapter 3.9.3). The camera model assumes a single entocentric line-scan camera. This model is then extended to a single telecentric line-scan camera and subsequently extended to a multi-view setup of telecentric line-scan cameras.

Figure 3:
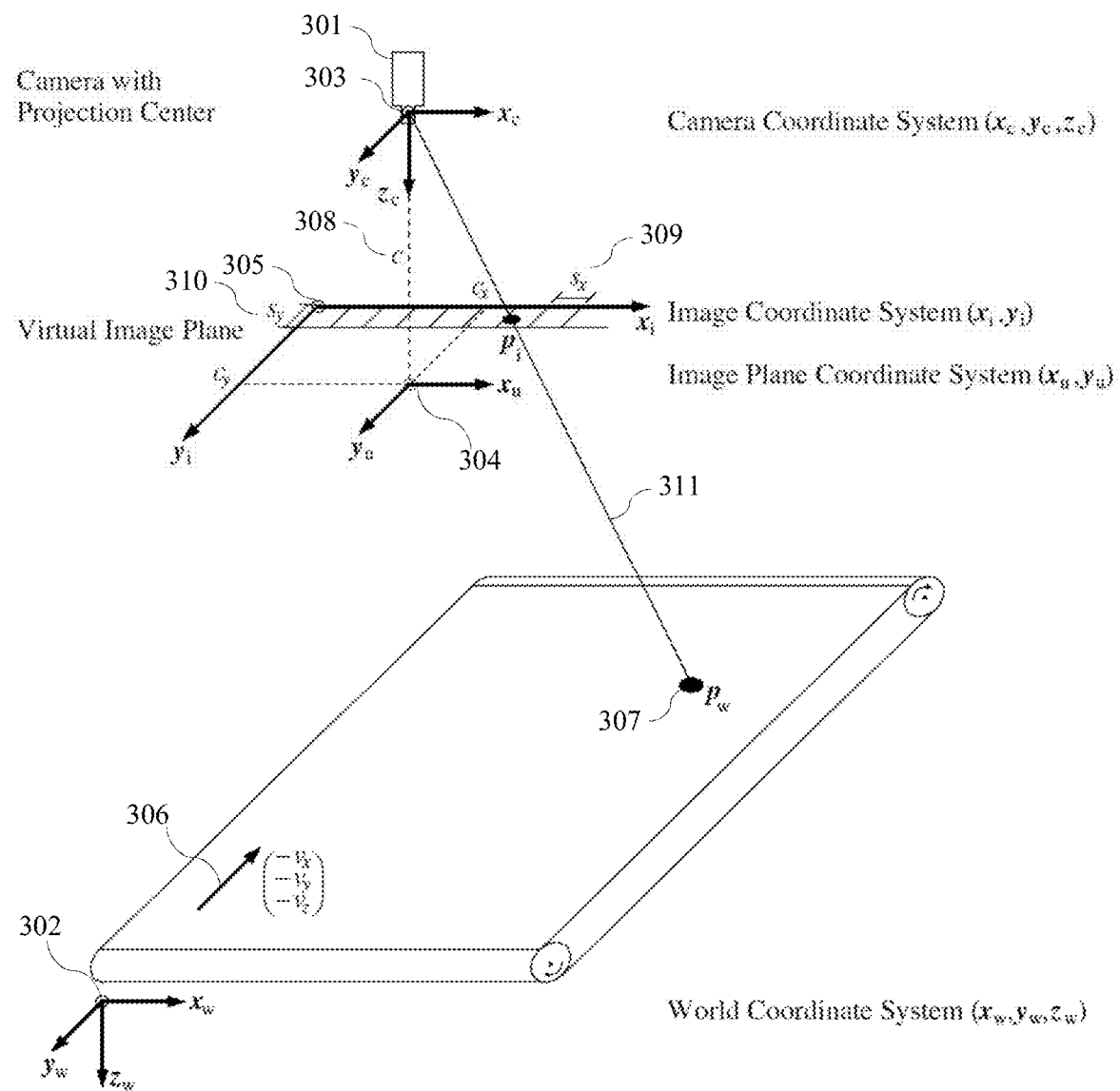
FIG. 3 shows the camera model of an entocentric line-scan camera.

The model for a single entocentric line-scan camera is visualized in FIG. 3. The model assumes that the relative motion between the line-scan camera 301 and the object 307 is linear with constant velocity. Therefore, the camera motion can be described by the motion vector $v=(v_x, v_y, v_z)^T$ 306 in the camera coordinate system. The vector v is described in units of meters per scan line in the (reference) camera coordinate system (i.e., the units are m Pixel$^{-1}$). This definition of v assumes a moving camera and a fixed object. If the camera is stationary and the object is moving, e.g., on a conveyer belt, the negative motion vector −v can be used.

The origin of the camera coordinate system 303 lies at the center of the entrance pupil of the lens. The x axis is parallel to the sensor line and perpendicular to the z axis. The y axis is perpendicular to the sensor line and to the z axis. It is oriented such that the motion vector has a positive y component, i.e., if a fixed object is assumed, the y axis points in the direction in which the camera is moving.

Like for area-scan cameras, the transformation from the calibration object coordinate system 302 to the camera coordinate system 303 is given by (1). In contrast to area-scan cameras, the exterior orientation refers only to the first line of the image. Since the camera moves relative to the object, the exterior orientation is different for each line. However, because we assume a linear motion, the motion vector v can be used to compute the exterior orientation of all lines. Therefore, the single exterior orientation is sufficient.

For highest measurement accuracy, the camera model should support line-scan cameras for which the sensor line is not perfectly aligned with the optical axis. Therefore, the sensor line is modelled as one particular line of a virtual area-scan camera. We use the principal point $(c_x, c_y)^T$ to model this misalignment (304). The semantics of $c_y$ are slightly different than for area-scan cameras: $c_y=0$ signifies that the sensor line is perfectly aligned with the optical axis in the y direction. The principal point defines the origin of the image plane coordinate system.

The remaining parameters of the camera model are identical to those of area-scan cameras (see above): c is the principal distance 308, the lens distortions are described by (5) or (7), and $s_x$ 309 and $s_y$ 310 describe the pixel pitch on the sensor.

To compute the projection of a point $p_k$ that is given in the camera coordinate system, we can use the fact that $p_k$ moves along the straight line $p_k-tv$, where t denotes the number of scan lines that have been acquired since the first scan line. As the point moves, it must at some point intersect the optical ray of an image point if it projects to a point $p_s=(x_s,0)^T$ on the sensor line. The above definition of the principal point implies that points on the sensor line have a y coordinate of 0. To obtain the optical ray (311) for an entocentric camera, (8) is inverted:

$$\begin{pmatrix} x_d \\ y_d \end{pmatrix} = \begin{pmatrix} s_x(x_i - c_x) \\ s_y(y_i - c_y) \end{pmatrix}. \quad (9)$$

Then, lens distortions are rectified by applying (5) or (7) to obtain the undistorted coordinates in the image plane coordinate system (304). For entocentric lenses, the optical ray is given by:

$$(0,0,0)^T + \lambda(x_u, y_u, c)^T. \quad (10)$$

Let us assume that we have transformed the point $p_s$ to a distorted image point $p_d$ by (9), i.e., $(x_d, y_d)^T = (s_x(x_x-c), -s_y c_y)^T$. Furthermore, let us call the undistortion function in (5) or (7) $u(p)=(u_x(x_d,y_d), u_y(x_d,y_d))^T$. Then, the intersection of the moving point and the optical ray results in the following equation system:

$$\lambda u_x(x_d, y_d) = x_k - tv_x$$

$$\lambda u_y(x_d, y_d) = x_k - tv_x.$$

$$\lambda c = z_z - tv_z \quad (11)$$

For the division model (5), the equation system specializes to:

$$\lambda u x_d = x_k - tv_x$$

$$\lambda u x_d = y_k - tv_y,$$

$$\lambda c = z_k - tv_z \quad (12)$$

where $u=1/(1+\kappa(x_d^2+y_d^2))$.

The equation system (11), which for the division and the polynomial distortion model is a polynomial equation system, must be solved for $\lambda$, t, and $x_d$. The equation system (12) of the division model can be solved analytically, while that of the polynomial system can be solved numerically. Once t and $x_d$ have been determined, the point is transformed into the image coordinate system by:

$$\begin{pmatrix} x_i \\ y_i \end{pmatrix} = \begin{pmatrix} x_d/s_x + c_x \\ t \end{pmatrix}. \quad (13)$$

The interior orientation of line-scan cameras with entocentric lenses is therefore given by the parameters: c; x or $K_1, K_2, K_3, P_1, P_2$; $s_x, s_y, c_x, c_y, v_x, v_y$, and $v_z$. Thus, in a preferred embodiment of the invention, the motion vector v is part of the interior orientation because it affects the projection of a point given in the camera coordinate system (see (11)). In an alternative embodiment of the invention, the motion vector is part of the exterior orientation.

It is important to note that a pure removal of lens distortions is impossible for entocentric line-scan cameras if $c_y \neq 0$. In this case, the optical ray for an image point does not project to a single point in the rectified image. Therefore, a pure removal of lens distortions requires a 3D reconstruction to be available because we can then reconstruct a unique 3D point that can be projected into the rectified image.

Camera Model for a Single Telecentric Line-Scan Camera

The first part of the camera model for a single telecentric line-scan camera is identical to that of the camera model for a single entocentric line-scan camera: Points from the calibration object coordinate system are transformed to the camera coordinate system by (1) and (2). To project the point $p_k$ into the image, the same approach is used as for the entocentric line-scan camera: The line on which the point moves is intersected with the optical ray of the point to which it projects.

The equation of the optical ray for a telecentric lens is given by $$(x_t/m, y_t/m, 0)^T + \lambda(0,0,1)^T. \quad (14)$$

This results in the following equation system:

$$u_x(x_d,y_d)/m = x_k - tv_x \tag{15}$$

$$u_y(x_d,y_d)/m \times y_k - tv_y \tag{16}$$

$$\lambda = z_k - tv_z. \tag{17}$$

where $u(p)=(u_x(x_d,y_d),u_y(x_d,y_d))^T$ is defined in the same way as for the entocentric case. It can be seen that $\lambda$ does not occur in (15) and (16). Therefore, neither $z_k$ nor $v_z$ influence the projection and (17) can be omitted. Consequently, line-scan cameras with telecentric lenses perform an orthographic projection, similar to area-scan cameras with telecentric lenses.

For the polynomial model, (15) and (16) define a polynomial equation system of degree 7 in the unknowns $x_d$ and t. Therefore, the equations cannot be solved analytically, i.e., a numerical root finding algorithm must be used to solve them. For the division model, however, an analytical solution is possible. Specializing (15) and (16) to the division model results in the following equation system:

$$ux_d/m = x_k - tv_x \tag{18}$$

$$uy_d/m = y_k - yv_y, \tag{19}$$

where again $u=1/(1+\kappa(x_d^2+y_d^2))$. Since $y_d=-s_y c_y$ is constant, (19) can be solved for t:

$$t = \frac{1}{v_y}\left(y_k - \frac{y_d}{m(1+\kappa(x_d^2+y_d^2))}\right). \tag{20}$$

Substituting (20) into (18) and sorting the terms according to powers of $x_d$ results in:

$$\kappa\left(x_k - y_k\frac{v_x}{v_y}\right)x_d^2 - \frac{1}{m}x_d + (1+\kappa y_d^2)\left(x_k - y_k\frac{v_x}{v_y}\right) + \frac{y_d}{m}\frac{v_x}{v_y} = 0. \tag{21}$$

The term $x_k - y_k v_x/v_y$ is the x coordinate of the point at which the line $(x_k, y_k)^T - t(v_x,v_y)^T$ intersects the x axis (or, in 3D, at which the line $(x_k,y_k,z_k)^T - t(v_x,v^y,v_z)^T$ intersects the xz plane). Let $x_0 := x_k - y_k v_x/v_y$. The term $1+\kappa y_d^2$ represents the inverse of the undistortion factor u for $x_d = 0$. Let $d_0 := 1+\kappa y_d^2$. With the definition of $x_0$ and $d_0$, it follows:

$$\kappa x_0 x_d^2 - \frac{1}{m}x_d + x_0 d_0 + \frac{y_d}{m}\frac{v_x}{v_y} = 0. \tag{22}$$

Hence, for $\kappa \neq 0$ and $x_0 \neq 0$, we have:

$$x_d = \frac{\frac{1}{m} \pm \sqrt{\frac{1}{m^2} - 4\kappa x_0\left(x_0 d_0 + \frac{y_d}{m}\frac{v_x}{v_y}\right)}}{2\kappa x_0}. \tag{23}$$

For $\kappa=0$ or $x_0=0$, (22) reduces to a linear equation. We examine both cases in turn. For $x_0=0$, we have:

$$x_d = y_d \frac{v_x}{v_y}. \tag{24}$$

Inserting the value of $x_d$ obtained from (23) and (24) into (20) returns the value of t in both cases. For $\kappa=0$, we have:

$$x_d = mx_0 + y_d\frac{v_x}{v_y}. \tag{25}$$

In this case, (20) can be simplified to:

$$t = \frac{1}{v_y}\left(y_k - \frac{y_d}{m}\right). \tag{26}$$

For $\kappa=0$, $y_d$, i.e., $c_y$, is not meaningful. Therefore, if it is known a priori that $\kappa=0$, $c_y$ (and, therefore, $y_d$) should be set to 0, which simplifies the equations even further to:

$$x_d = mx_0 = m\left(x_k - y_k\frac{v_x}{v_y}\right) \tag{27}$$

$$t = \frac{y_k}{v_y}. \tag{28}$$

If there are lens distortions, it can be seen from (23) that there are two potential solutions for the projection into the image, whereas in the cases without distortion, (24) and (25), there is a unique solution. It can be proven that the correct solution of (23) is always given by:

$$x_d = \frac{\frac{1}{m} - \sqrt{\frac{1}{m^2} - 4\kappa x_0\left(x_0 d_0 + \frac{y_d}{m}\frac{v_x}{v_y}\right)}}{2\kappa x_0}. \tag{29}$$

The optical ray of an image point $(x_i,y_i)^T$ can be computed as follows. First, (13) is inverted:

$$\begin{pmatrix} x_d \\ t \end{pmatrix} = \begin{pmatrix} s_x(x_i - c_x) \\ y_i \end{pmatrix}. \tag{30}$$

Next, (15) and (16) are solved for $(x_k,y_k)^T$:

$$x_k = u_x(x_d,y_d)/m + tv_x \tag{31}$$

$$y_k = u_y(x_d,y_d)/m + tv_y, \tag{32}$$

where $y_d = -s_y c_y$. The optical ray is then given by:

$$(x_k,y_k,0)^T + \lambda(0,0,1)^T. \tag{33}$$

In contrast to line-scan cameras with entocentric lenses, a pure removal of lens distortions is possible for line-scan cameras with telecentric lenses because (15) and (16) do not depend on $z_k$. Given an image point $(x_i,y_i)^T$, the corresponding point $(x_k,y_k)^T$ in the camera coordinate system can be computed with (30)-(32). This point can then be projected into a rectified camera for which all distortion coefficients have been set to 0. Moreover, any skew in the pixels can be removed by setting $v_x$ to $\min(s_x,mv_y)$ and then setting $v_y$ to $s_x/m$. This approach ensures that no aliasing occurs when rectifying the image.

Calibration of a Single Telecentric Line-Scan Camera

Figure 5:
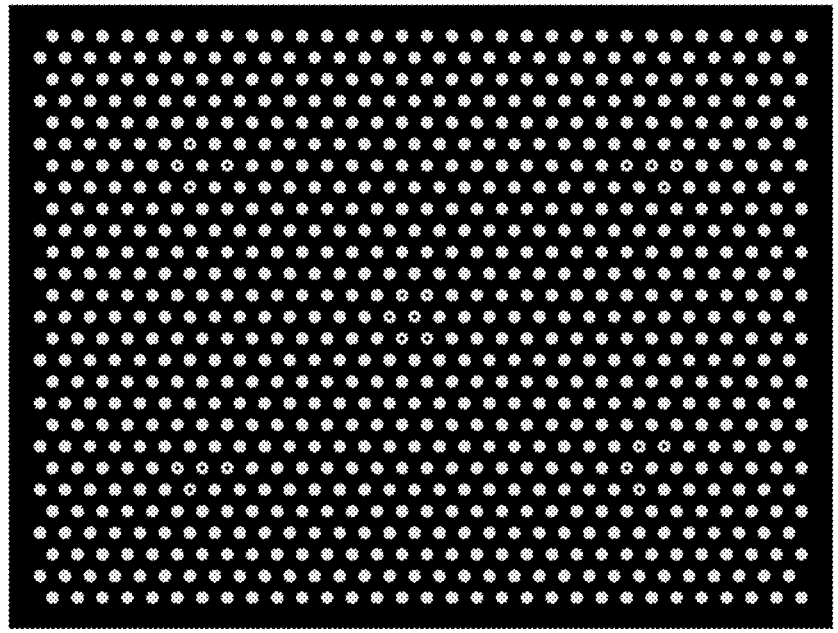
FIG. 5 shows two examples of a planar calibration object with circular control points.
Figure 5:
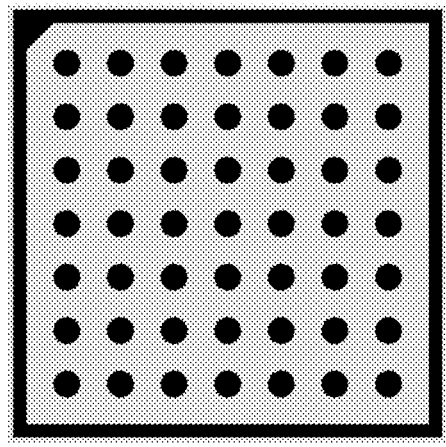

Camera calibration is the process of determining the camera parameters, i.e., in the case of a single telecentric line-scan camera the parameters of the interior and exterior orientation. The camera is calibrated by using a calibration object. The calibration object contains a sufficient number of control points of which the 3D world coordinates must be known. Different types of calibration objects can be used for this task as described in the section Background of the Invention. In a preferred embodiment of the invention, a planar calibration object with circular control points is used. Two examples of this kind of calibration object are shown in FIG. 5. While in the following description, a planar calibration object with circular control points is used for illustration purposes, alternatively other calibration objects can be used for calibration without departing from the scope of the invention. In an alternative embodiment, for example, a planar calibration object with a checkerboard pattern is used for calibration. In another alternative embodiment, a 3D calibration object is used, where the control points are not restricted to lie in a single plane.

Let the known 3D coordinates of the centers of the control points of the calibration object be denoted by $p_j$ (j=1 ..., $n_m$, where $n_m$ denotes the number of control points on the calibration object). The user acquires $n_o$ images of the calibration object. Let us denote the exterior orientation parameters of the calibration object in image l by $e_l$ (l=1, ..., $n_o$), the interior orientation parameters of the camera by i, and the projection of a point in the calibration object coordinate system to the image coordinate system by $\pi$ (see previous section). In addition, let $v_{jl}$ denote a function that is 1 if the control point j of the observation l of the calibration object is visible with the camera, and 0 otherwise. Finally, let $p_{jl}$ denote the position of control point j in image l. Then, the camera is calibrated by minimizing the following function:

$$\varepsilon^2 = \sum_{l=1}^{n_o} \sum_{j=1}^{n_m} v_{jl} \|p_{jl} - \pi(p_j, e_l, i)\|_2^2. \tag{34}$$

The minimization is performed by using an appropriate optimization algorithm like the Gauss-Newton algorithm, the gradient descent algorithm, the Levenberg-Marquardt algorithm or a similar approach. In the preferred embodiment of the invention, a suitable version of the sparse Levenberg-Marquardt algorithms described in (Hartley and Zisserman, 2003, Appendix A6) is applied.

When using a planar calibration object with circular control points, the points $p_{jl}$ are extracted by fitting ellipses (Fitzgibbon et al., 1999) to edges extracted with a subpixel-accurate edge extractor (Steger 1998, Chapter 3.3; Steger 2000). As discussed by Steger (2017, Section 5.2) and Mallon and Whelan (2007), this causes a bias in the point positions. Since telecentric line-scan cameras perform an orthographic projection, there is no perspective bias, i.e., the bias consists solely of distortion bias. The bias can be removed with the approach for entocentric line-scan cameras described by Steger (2018, Section 10).

The optimization of (34) requires initial values for the unknown camera parameters. Initial values for the interior orientation parameters, except for the motion vector, can be obtained from the specification of the camera and the lens, as described in the section Camera Model for Multi-View Setup of Area-Scan Cameras. In contrast to area-scan cameras, $c_y$=0 is typically used as the initial value. An approximate value for $v_y$ usually will be known from the considerations that led to the line-scan camera setup. Finally, $v_x$ typically can be set to 0. With known initial values for the interior orientation, the image points $p_{jl}$ can be transformed into metric coordinates in the camera coordinate system using (30)-(32). This allows using the OnP algorithm described by Steger (2018) to obtain estimates for the exterior orientation of the calibration object.

Model Degeneracies

The model for telecentric line-scan cameras is overparameterized. The values of m and $s_x$ cannot be determined simultaneously. This can be solved by fixing $s_x$ at the initial value that was specified by the user. Furthermore, like for entocentric line-scan cameras, $s_y$ is only used to specify the principal point in pixels and is therefore kept fixed at the initial value specified by the user.

Like for telecentric area-scan cameras, $(c_x,c_y)^T$ is solely defined by the lens distortions for telecentric line-scan cameras. If there are no lens distortions, $(c_x,c_y)^T$ and $(t_{l,x},t_{l,y})^T$ have the same effect. Therefore, in this case $(c_x,c_y)^T$ should remain fixed at the initial value specified by the user (typically, $c_x$ is set to the horizontal image center and $c_y$ is set to 0).

Like for entocentric line-scan cameras, the parameters $P_1$ and $P_2$ of the polynomial distortion model are highly correlated with other parameters of the telecentric line-scan camera model, especially if the radial distortions are small. Therefore, they typically cannot be determined reliably. Consequently, in practice, they should be set to 0 and should be excluded from the calibration.

Neither $t_z$ nor $v_z$ can be determined since they have no effect on the projection (cf. Section Camera Model for a single Telecentric Line-Scan Camera). One possible way to deal with this is to leave $v_z$ at the initial value specified by the user and set $t_z$ to 1 m.

There is a sign ambiguity for $v_y$. Therefore, the user must specify the initial value of $v_y$ with the correct sign to ensure the calibration converges to the correct solution.

Like for telecentric area-scan, the rotation of the pose of a planar calibration object can only be determined up to a twofold ambiguity. The two sets of pose parameters $(\alpha_l,\beta_l,\gamma_l)$ and $(-\alpha_l,-\beta_l,\gamma_l)$ (with identical translation vectors) result in the same points in the image. If a correct exterior orientation of the calibration object is required in the application, the user must resolve this ambiguity by selecting the correct pose based on prior knowledge.

A rotation of a planar calibration object around the x axis can be exchanged with different values for the speed $v_y$ and the translation $t_y$. Furthermore, a rotation of a planar calibration object around the y axis can be exchanged with different values for the magnification m, the speed $v_x$, and the translation $t_x$.

Telecentric line-scan cameras cannot be fully calibrated from a single image of a planar calibration object. Consequently, multiple images of a planar calibration object with different exterior orientation must be used to calibrate the camera if all parameters are to be determined unambiguously.

In machine vision applications, it sometimes is important to calibrate all camera parameters from a single image. As the above discussion shows, this will lead to camera parameters that differ from their true values if a planar calibration object is used. However, if the residual error of the calibration is sufficiently small, a camera geometry that is consistent within the plane that is defined by the exterior orientation of the calibration object (and all planes parallel thereto) will be obtained. Therefore, an image or features extracted from an image can be rectified to this plane. On the other hand, algorithms that solely rely on the interior orientation, e.g., the pure removal of radial distortions, are less useful because the ambiguities with respect to m and $v_y$ imply that we cannot reliably undistort an image or features extracted from an image to have square pixels.

Camera Model for Multi-View Setup of Telecentric Line-Scan Cameras

To perform stereo reconstruction with line-scan cameras with telecentric lenses, a stereo setup with at least two cameras is needed. For this, the camera model of a single telecentric line-scan camera, which is described in section Camera Model for a single Telecentric Line-Scan Camera is extended to the multi-view case. This can be done in a similar way as for area-scan cameras, which is described in section Camera Model for Multi-View Setup of Area-Scan Cameras. Consequently, the camera model for a multi-view setup of telecentric line-scan cameras comprises the following camera parameters at step 104:

The six parameters of the exterior orientation (modeling the pose of the calibration objects in the $n_o$ images): $\alpha_l$, $\beta_l$, $\gamma_l$, $t_{l,x}$, $t_{l,y}$, and $t_{l,z}$.

The six parameters of the relative orientation of the $n_c$ cameras with respect to camera 1: $\alpha_k$, $\beta_k$, $\gamma_k$, $t_{k,x}$, $t_{k,y}$, and $t_{k,z}$.

The interior orientation of each camera: $m_k$; $\kappa_k$ or $K_{k,1}$, $K_{k,2}$, $K_{k,3}$, $P_{k,1}$, $P_{k,2}$; $s_{k,x}$, $s_{k,y}$, $c_{k,x}$, $c_{k,y}$, $v_{k,x}$, $v_{k,y}$, and $v_{k,z}$.

This camera model is able to model cameras that independently move over a fixed object. Therefore, each camera has an individual motion vector $v_k = (v_{k,x}, v_{k,y}, v_{k,z})^T$.

Alternatively, if the cameras are mounted rigidly with respect to each other and the object performs a movement relative to the cameras, the motion vectors of the individual cameras are related to each other by the corresponding relative orientations. In this case, the camera model includes only a single global motion vector $v = (v_x, v_y, v_z)^T$, which is described in the camera coordinate system of the reference camera (e.g., camera 1), for example. In this case, the camera model consists of the following camera parameters (step 104):

The six parameters of the exterior orientation (modeling the pose of the calibration objects in the $n_o$ images): $\alpha_l$, $\beta_l$, $\gamma_l$, $t_{l,x}$, $t_{l,y}$, and $t_{l,z}$.

The six parameters of the relative orientation of the $n_c$ cameras with respect to camera 1: $\alpha_k$, $\beta_l$, $\gamma_k$, $t_{k,x}$, $t_{k,y}$, and $t_{k,z}$.

The interior orientation of each camera: $m_k$; $\kappa_k$ or $K_{k,1}$, $K_{k,2}$, $K_{k,3}$, $P_{k,1}$, $P_{k,2}$; $s_{k,x}$, $s_{k,y}$, $c_{k,x}$, $c_{k,y}$.

The motion vector of the reference camera 1: $v_x$, $v_y$, and $v_z$.

As described in section Camera Model for Multi-View Setup of Area-Scan Cameras, a point $p_l$ in the camera coordinate system of the reference camera is transformed into the camera coordinate system of camera k ($k=1, \ldots, n_c$) by applying (2). Accordingly, the motion vector $v_k$ of camera k is obtained from the motion vector v of the reference camera by multiplying it with the rotation matrix of the corresponding relative orientation:

$$v_k = R_k v. \tag{35}$$

Calibration of a Multi-View Setup of Telecentric Line-Scan Cameras

Calibrating a multi-view setup of telecentric line-scan cameras (103) is based on the calibration of a single telecentric line-scan camera, which was described in section Calibration of a single Telecentric Line-Scan Camera. For the case that the cameras move independently over a fixed object, i.e., each camera is assigned an individual motion vector, the multi-view setup of telecentric line-scan cameras can for example be calibrated by minimizing the following function:

$$\varepsilon^2 = \sum_{l=1}^{n_o} \sum_{k=1}^{n_c} \sum_{j=1}^{n_m} v_{jkl} \| p_{jkl} - \pi(p_j, e_l, r_k, i_k) \|_2^2. \tag{36}$$

In contrast to the single camera case (see (34)), an additional summation is performed over the number of cameras $n_c$. $v_{jkl}$ denotes a function that is 1 if the control point j of the observation l of the calibration object is visible in camera k, and 0 otherwise. Furthermore, $p_{jkl}$ denotes the position of control point j in image l of camera k. Finally, $r_k$ ($k=1, \ldots, n_c$) denotes the relative orientation parameters of the camera k with respect to the reference camera 1. Note that the interior orientation $i_k$ of camera k also includes the motion vector $v_k$ of each camera.

For the case that the cameras are mounted rigidly with respect to each other and the object performs a movement relative to the cameras, the multi-view setup of telecentric line-scan cameras can for example be calibrated by minimizing the following function:

$$\varepsilon^2 = \sum_{l=1}^{n_o} \sum_{k=1}^{n_c} \sum_{j=1}^{n_m} v_{jkl} \| p_{jkl} - \pi(p_j, e_l, r_k, i_k, v) \|_2^2. \tag{37}$$

In this case, the motion vector of the reference camera v is a global parameter in the optimization. It is transformed to camera k by applying (35) with the parameters of the rotation part of the relative orientation.

In an alternative embodiment, the minimization is performed by introducing individual weights for the observations $p_{jkl}$, for example to take knowledge about the accuracies of the observations into account during the optimization. Furthermore, in (36) and (37), the error is minimized in the image coordinate system. In an alternative embodiment, the minimization is instead performed in the image plane coordinate system, as described by Steger (2018, Section 3.9.4.2) for the calibration of area-scan cameras.

As the result of the calibration, values for the camera parameters (step 104) are obtained. The camera parameters comprise the parameters of the interior and relative orientations of all cameras and the parameters of the absolute orientation of the calibration object in all images. Furthermore, in the case of a single motion vector, the camera parameters additionally comprise the three components of the global motion vector because the motion vector in this case is not part of the individual interior orientations.

It can be easily recognized that the calibration of two cameras is a special case of the described multi-camera calibration. Therefore, a detailed description would be redundant and is therefore omitted in this description. Furthermore, the camera model and the calibration can be easily extended to support an arbitrary mixture of individual and global motion vectors. One example application in which mixed motion vectors are useful is a system of three cameras where two of the three cameras are rigidly connected to each other and hence share the same motion vector while the third camera performs an individual motion.

Computation of a Telecentric Rectification Mapping

In a third step 105, based on the camera parameters that result from the camera calibration, a telecentric rectification mapping (106) is computed that rectifies a telecentric line-scan image pair of a pair of telecentric line-scan cameras. Therefore, in the case of a multi-view setup with more than two cameras, a pair of telecentric line-scan cameras is selected for stereo reconstruction.

The telecentric rectification mapping describes the geometric transformation of the telecentric line-scan image pair to the epipolar standard geometry, which is also denoted as stereo image rectification. Consequently, when applying the mapping to a telecentric line-scan image pair, the obtained rectified telecentric line-scan image pair is free of lens distortions and corresponding image points lie in the same image row.

Conceptually, the first part of the computation of the telecentric rectification mapping is the elimination of lens distortions, if lens distortions are present. As described in section Camera Model for a single Telecentric Line-Scan Camera, a pure removal of lens distortions is possible for line-scan cameras with telecentric lenses. Therefore, for each original image of the telecentric line-scan image pair, a mapping is computed that contains for each pixel in a rectified image, the corresponding pixel in the original image. In the rectified image, all distortion coefficients are set to 0. Moreover, any skew in the pixels is removed by, for example, setting $s_x$ to $\min(s_x, mv_y)$ and then setting $v_y$ to $s_x/m$. This ensures that no aliasing occurs when rectifying the image.

The second part of the computation of the telecentric rectification mapping is the geometric transformation of the telecentric line-scan image pair to the epipolar standard geometry. Because of the first part of the rectification just described, it can be assumed that the telecentric line-scan image pair is already free of lens distortions and pixel skew and has square pixels.

One important aspect of the invention is the fact that a telecentric line-scan camera with no distortions can be represented as a telecentric area-scan camera. More specifically, a telecentric line-scan camera with parameters $m_l = m$, $s_{x,l} = s_x$, $s_{y,l} = s_y$, $c_{x,l} = c_x$, $c_{y,l} = c_y$, $v_{x,l} = 0$, and $v_{y,l} = v_y = s_x/m$ (see section Camera Model for a single Telecentric Line-Scan Camera) can be represented by a telecentric area-scan camera with parameters $m_a = m$, $s_{x,a} = s_x$, $s_{y,a} = s_x$, $c_{x,a} = c_x$, and $c_{y,a} = c_y s_x / s_x$ (see section Camera Model for Multi-View Setup of Area-Scan Cameras). This allows us to use existing stereo reconstruction functionality for telecentric area-scan cameras also for telecentric line-scan cameras.

In addition to the telecentric rectification mapping, the camera parameters of the rectified telecentric line-scan cameras are returned from this step. These camera parameters are denoted as rectified camera parameters (step 107).

In a preferred embodiment of the invention, existing stereo reconstruction functionality for telecentric area-scan cameras is used to rectify the telecentric line-scan images into the epipolar standard configuration. When using the software HALCON (MVTec Software GmbH, 2019), for example, the operator gen_binocular_rectification_map computes a suitable rectification mapping. Alternatively, the affine fundamental matrix (Hartley and Zisserman, 2003, Chapter 14.2) is computed and the images are transformed into the epipolar standard configuration by the method described in (Hartley and Zisserman, 2003, Chapter 11.12). Explicit methods to compute the epipolar rectification transformation are given by Morgan et al. (2006) and Liu et al. (2016), for example.

Although both rectification parts (rectification of the lens distortions and rectification into the epipolar standard geometry) can be executed consecutively, they are combined into a single rectification step in the preferred embodiment of the invention. The advantage of the combined over the separate execution is a lower computation time because only a single (instead of two) telecentric rectification mapping needs to be applied in the online phase.

In a preferred embodiment of the invention, the previously described first three steps are performed offline once after setting up the system. Consequently, the three steps need to be re-executed only if the camera setup changes and if this change influences the parameters that are estimated during camera calibration. The telecentric rectification mapping is stored for later use in the online phase. In a preferred embodiment, the rectification mapping is stored as a look-up-table (LUT) to enable an efficient rectification in the online phase. The LUT stores for each pixel in the rectified telecentric line-scan image the position of the corresponding pixel in the original telecentric line-scan image. The LUT may optionally contain weights for an appropriate gray value interpolation to obtain rectified images of higher quality resulting in a higher accuracy of the final 3D reconstruction.

Acquisition a Telecentric Line-Scan Image Pair of the 3D Object

In a fourth step (201), the online phase starts with the acquisition of telecentric line-scan images of the 3D object that is to be reconstructed by using the setup that was previously calibrated with the method described in the first three steps. Because for a 3D reconstruction at least two cameras are necessary, in the preferred embodiment a telecentric line-scan image pair (203) with a pair of telecentric line-scan cameras is acquired. For the reconstruction of the 3D object, a single image pair is sufficient. In an alternative embodiment, a telecentric line-scan image pair (203) is selected from a multi-view setup of more than two telecentric line-scan cameras. Each telecentric line-scan image is created by performing the relative motion in an identical way as is was performed during the acquisition of the telecentric line-scan calibration images in the first step.

Rectification of the Telecentric Line-Scan Image Pair

In a fifth step 204, the acquired telecentric line-scan image pair of the 3D object to be reconstructed is rectified by using the telecentric rectification mapping (106/202) that was computed in step three 105 for the respective pair of telecentric line-scan cameras. In a preferred embodiment of the invention, the rectification is efficiently performed by applying the LUT that was computed in step three. For example, when using the software HALCON (MVTec Software GmbH, 2019), the operator map_image can be used for applying the telecentric rectification mapping. As a result, a rectified telecentric line-scan image pair (205) is obtained. Corresponding points in the rectified telecentric line-scan image pair lie in the same image row. Furthermore, the resulting rectified telecentric line-scan image pair is free of lens distortions.

Computation of Disparities from the Rectified Telecentric Line-Scan Image Pair

In a sixth step 206, the disparities (208) are computed from the resulting rectified telecentric line-scan image pair 205 by one of different available stereo matching approaches that exploit the epipolar standard geometry (see section Binocular Stereo—Stereo Matching). In a preferred embodiment of the invention, an approach for dense disparity estimation is applied yielding a disparity image that contains for each defined pixel a disparity value. Undefined pixels may occur, for example, in case of occlusions or in low-textured image parts, where corresponding pixels cannot be determined reliably. In an alternative embodiment, the disparities are calculated for a selected set of pixels. In a preferred embodiment, a dense disparity estimation approach that is based on template matching is applied (Steger et al., 2018, Chapter 3.10). In another preferred embodiment, a dense disparity estimation method that is based on variational approaches is applied. Such methods are able to compute disparities even in low-textured image regions. Because of the modular structure of the method that is described in the invention, other alternative disparity estimation approaches can be easily integrated without departing from the scope of the invention.

The disparity of a 3D point is closely related to its distance from the rectified cameras (see the next section). Therefore, in a preferred embodiment of the invention, the computed disparities represent the reconstruction of the 3D object.

Conversion of Disparities to Distances

In a seventh step 209, the disparities 208 that are computed in the sixth step 206 are converted into distances (step 210). For this conversion the rectified camera parameters (steps 107/207) that are obtained in the third step 105 are used.

Because the rectified telecentric line-scan image pair is free of lens distortions, each rectified line-scan image can be interpreted as an image of an affine camera (Hartley and Zisserman, 2003, Chapter 6.3.4). Consequently, standard algorithms for triangulation (Hartley and Zisserman, 2003, Chapter 14.4) and affine reconstruction can be applied (Hartley and Zisserman, 2003, Chapter 14.5) for the distance computation. The distances are typically obtained in the coordinate system of the rectified telecentric line-scan image pair, i.e., they represent the distances of a point to the plane that is defined by the y axes of both rectified cameras and their baseline.

In a preferred embodiment, the distances are computed for each defined pixel in the disparity image, yielding a distance image. The disparities implicitly represent corresponding points in the two rectified images. Converting disparity values into distance values corresponds to intersecting the two lines of sight of corresponding points (Steger et al., 2018, Chapter 3.10.1.5). The first line of sight is defined by the point position in the first rectified image and the direction of the optical axis of the first rectified camera. The second line of sight is defined by the point position in the second rectified image and the direction of the optical axis of the second rectified camera. The point position in the second image is obtained as follows: Because of the epipolar standard configuration, its row coordinate is identical to the row coordinate in the first image. The column coordinate in the second image corresponds to the column coordinate of the first image modified by the disparity value (Steger et al., 2018, Chapter 3.10.1.5).

In another preferred embodiment, the distance image (step 210) represents the reconstruction of the 3D object. In an alternative embodiment, the distance values are further converted into 3D coordinates (step 210) based on their row and column coordinates in the distance image and based on the interior orientation of the rectified camera parameters (step 107/207). The 3D coordinates, for example, be stored in a coordinate image with three channels. Alternatively, the 3D coordinates can be stored in a suitable model representation data structure of the 3D object.

In another preferred embodiment, the reconstructed distance values or the reconstructed 3D coordinates, respectively, are transformed back into the coordinate system of one of the original cameras, for example the reference camera. This rigid 3D transformation can be obtained from the relative orientation of the rectified camera parameters and the relative orientation of the original camera parameters.

While several particular embodiments of the invention have been described in detail, various modifications to the preferred embodiments can be made without departing from the spirit and scope of the invention. Accordingly, the above description is not intended to limit the invention except as indicated in the following claims.

REFERENCES CITED

G. Blahusch, W. Eckstein, C. Steger, S. Lanser: Algorithms and evaluation of a high precision tool measurement system. In: $5^{th}$ International Conference on Quality Control by Artificial Vision, 31-36, 1999.

D. C. Brown: Decentering distortion of lenses. Photogrammetric Engineering 32(3):444-462, 1966.

D. C. Brown: Close-range camera calibration. Photogrammetric Engineering 37(8):855-866, 1971.

M. Z. Brown, D. Burschka, G. D. Hager: Advances in computational stereo. IEEE Transactions on Pattern Analysis and Machine Intelligence, 25 (8), 993-1008, 2003.

R. Calow, T. Ilchev, E. Lilienblum, M. Schnitzlein, B. Michaelis: Schnelles Zeilensensorsystem zur gleichzeitigen Erfassung von Farbe und 3D-Form. In: F. P. León, M. Heizmann (eds), Forum Bildverarbeitung, KIT Scientific Publishing, Karlsruhe, 181-192, 2010.

A. Fitzgibbon, M. Pilu, R. B. Fisher: Direct least square fitting of ellipses. IEEE Transactions on Pattern Analysis and Machine Intelligence, 21(5):476-480, 1999.

A. W. Fitzgibbon: Simultaneous linear estimation of multiple view geometry and lens distortion. In: IEEE Conference on Computer Vision and Pattern Recognition, vol I, 125-132, 2001.

R. Gerdes, R. Otterbach, R. Kammuller: Kalibrierung eines digitalen Bildverarbeitungssystems mit CCD-Kamera Teil 1: Modellbildung und Verfahren. Technisches Messen, 60(6), 255-261, 1993.

S. X. Godber, M. Robinson, J. P. Evans: Line-scan sensor: an alternative sensor modality for the extraction of three-dimensional coordinate information. Optical Engineering 34(10):3044-3054, 1995.

R. Gupta, R. I. Hartley: Linear pushbroom cameras. IEEE Transactions on Pattern Analysis and Machine Intelligence 19(9):963-975, 1997.

A. F. Habib, M. F. Morgan, S. Jeong, K. O. Kim: Epipolar geometry of line cameras moving with constant velocity and attitude. ETRI Journal 27(2):172-180, 2005a.

A. F. Habib, M. Morgan, S. Jeong, K. O. Kim: Analysis of epipolar geometry in linear array scanner scenes. The Photogrammetric Record 20(109):27-47, 2005b.

R. Hartley, A. Zisserman: Multiple View Geometry in Computer Vision, 2nd edn. Cambridge University Press, Cambridge, 2003.

T. Ilchev, E. Lilienblum, B. Joedicke, B. Michaelis, M. Schnitzlein: A stereo line sensor system to high speed capturing of surfaces in color and 3D shape. In: P. Richard, M. Kraus, R. S. Laramee, J. Braz (eds), International Conference on Computer Graphics Theory and Applications, 809-812, 2012.

T. Kim: A study on the epipolarity of linear pushbroom images. Photogrammetric Engineering & Remote Sensing 66(8):961-966, 2000.
S. Lanser, C. Zierl, R. Beutlhauser: Multibildkalibrierung einer CCD-Kamera, in Mustererkennung (eds G. Sagerer, S. Posch, F. Kummert), Springer-Verlag, Berlin, Informatik aktuell, 481-491, 1995.
S. Lanser: Modellbasierte Lokalisation gestützt auf monokulare Videobilder, PhD thesis, Forschungs-und LehreinheitInformatik IX, Technische Universitat Munchen. Shaker Verlag, Aachen, 1997.
R. Lenz, D. Fritsch: Accuracy of videometry with CCD sensors. ISPRS Journal of Photogrammetry and Remote Sensing, 45 (2), 90-110, 1990.
E. Lilienblum, A. Al-Hamadi: A structured light approach for 3-D surface reconstruction with a stereo line-scan system. IEEE Transactions on Instrumentation and Measurement 64(5):1266-1274, 2015.
H. Liu, Z. Zhu, L. Yao, J. Dong, S. Chen, X. Zhang, Y. Shang: Epipolar rectification method for a stereovision system with telecentric cameras. Optics and Lasers in Engineering 83:99-105, 2016.
J. Mallon, P. F. Whelan: Which pattern? Biasing aspects of planar calibration patterns and detection methods. Pattern Recognition Letters 28(9):921-930, 2007.
M. Morgan, K. O. Kim, S. Jeong, A. Habib: Epipolar resampling of space-borne linear array scanner scenes using parallel projection. Photogrammetric Engineering & Remote Sensing 72(11):1255-1263, 2006.
MVTec Software GmbH: HALCON Application Note: Machine Vision in World Coordinates. HALCON Version 7.1, 2005a.
MVTec Software GmbH: HALCON/HDevelop Reference Manual. HALCON Version 7.1, 2005b.
MVTec Software GmbH: HALCON/HDevelop Reference Manual. HALCON Version 19.05, 2019.
D. Scharstein, R. Szeliski: A taxonomy and evaluation of dense two-frame stereo correspondence algorithms. International Journal of Computer Vision, 47 (1-3), 7-42, 2002.
C. Steger C: Unbiased extraction of curvilinear structures from 2D and 3D images. Dissertation, Fakultat fir Informatik, Technische Universitat Munchen, 1998.
C. Steger: Subpixel-precise extraction of lines and edges. In: International Archives of Photogrammetry and Remote Sensing, vol XXXIII, part B3, pp 141-156, 2000.
C. Steger: Estimating the fundamental matrix under pure translation and radial distortion. ISPRS Journal of Photogrammetry and Remote Sensing 74: 202-217, 2012.
Carsten Steger: A Comprehensive and Versatile Camera Model for Cameras with Tilt Lenses; in: International Journal of Computer Vision 123(2), 121-159, June 2017.
Carsten Steger, Markus Ulrich, Christian Wiedemann: Machine Vision Algorithms and Applications; Wiley-VCH, Weinheim, 2nd Edition, 2018.
B. Sun, J. Zhu, L. Yang, S. Yang, Y. Guo: Sensor for in-motion continuous 3D shape measurement based on dual line-scan cameras. Sensors 16(11):1949-1-1949-15, 2016.
B. Sun, J. Zhu, L. Yang, Y. Guo, J. Lin: Stereo line-scan sensor calibration for 3D shape measurement. Applied Optics 56(28):7905-7914, 2017.
M. Ulrich, C. Steger: A camera model for cameras with hypercentric lenses and some example applications, Machine Vision and Applications 30(6): 1013-1028, 2019.

The invention claimed is:

1. A method for reconstructing a 3D object with at least two telecentric line-scan cameras and at least one device configured to performing a relative motion of said 3D object with respect to said telecentric line-scan cameras enabling the acquisition of telecentric line-scan images, comprising the steps of
providing for each telecentric line-scan camera a set of telecentric line-scan calibration images, where said set contains one or more images;
performing a camera calibration based on said sets of telecentric line-scan calibration images;
based on the result of said camera calibration, computing a telecentric rectification mapping that rectifies a telecentric line-scan image pair of a pair of telecentric line-scan cameras;
providing a telecentric line-scan image pair for a pair of telecentric line-scan cameras of said 3D object; and
rectifying said telecentric line-scan image pair with said telecentric rectification mapping, yielding a rectified telecentric line-scan image pair.

2. The method of claim 1, wherein the following additional step is performed computing disparities from said rectified telecentric line-scan image pair, with the disparities representing the reconstructed 3D object.

3. The method of claim 2, wherein the following additional step is performed converting said disparities into distances, yielding a reconstruction of said 3D object.

4. The method of claim 2, wherein the following additional step is performed converting said disparities into 3D coordinates, yielding a reconstruction of said 3D object.

5. The method of claim 1, wherein said relative motion is a linear motion.

6. The method of claim 5, wherein said linear motion is of constant speed.

7. The method of claim 5, wherein the linear motion is of variable speed and the image acquisition of telecentric line-scan images is triggered appropriately to ensure a constant speed.

8. The method of claim 1, wherein said calibration images are images of a calibration object.

9. The method of claim 8, wherein said calibration object is a planar calibration object.

10. The method of claim 8, wherein said calibration object is a 3D calibration object.

11. The method of claim 1, wherein in said camera calibration, camera parameters are determined, which comprise parameters of exterior orientations for the telecentric line-scan calibration images and, for each telecentric line-scan camera, parameters of a relative and of an interior orientation.

12. The method of claim 1, wherein said telecentric rectification mapping rectifies a telecentric line-scan image pair of a pair of telecentric line-scan cameras to the epipolar standard geometry.

13. The method of claim 1, wherein said telecentric rectification mapping is stored in a look-up-table.

14. The method of claim 13, wherein rectifying said telecentric line-scan image pair comprises applying said look-up-table to said telecentric line-scan image pair.

15. The method of claim 1, wherein computing disparities from said rectified telecentric line-scan pair comprises a dense disparity estimation yielding a disparity image.

16. The method of claim 2, wherein converting said disparities into distances comprises computing a distance image.

17. The method of claim 1, wherein said camera calibration is performed by applying a sparse Levenberg-Marquardt algorithm.

18. A system for reconstructing a 3D object with at least two line-scan cameras, said system comprising:
- at least two telecentric line-scan cameras;
- at least one device configured to performing a relative motion of said 3D object with respect to said telecentric line-scan cameras;
- a computer configured for
  - acquiring with each telecentric line-scan camera a set of telecentric line-scan calibration images while performing said relative motion, where said set contains one or more images;
  - performing a camera calibration based on said sets of telecentric line-scan calibration images;
  - based on the result of said camera calibration, computing a telecentric rectification mapping that rectifies a telecentric line-scan image pair of a pair of telecentric line-scan cameras;
  - acquiring a telecentric line-scan image pair with a pair of telecentric line-scan cameras of said 3D object while performing said relative motion; and
  - rectifying said telecentric line-scan image pair of said 3D object with said telecentric rectification mapping, yielding a rectified telecentric line-scan image pair.

* * * * *